Dec. 5, 1950 P. L. BENNETT ET AL 2,532,883
CONDENSER MEANS FOR MEASURING LEVEL CONDITIONS
Filed April 30, 1945 3 Sheets-Sheet 1

Inventors
Paul L. Bennett &
Leland A. Bryant
By Fred Gerlad Atty.

Dec. 5, 1950  P. L. BENNETT ET AL  2,532,883
CONDENSER MEANS FOR MEASURING LEVEL CONDITIONS
Filed April 30, 1945  3 Sheets-Sheet 2
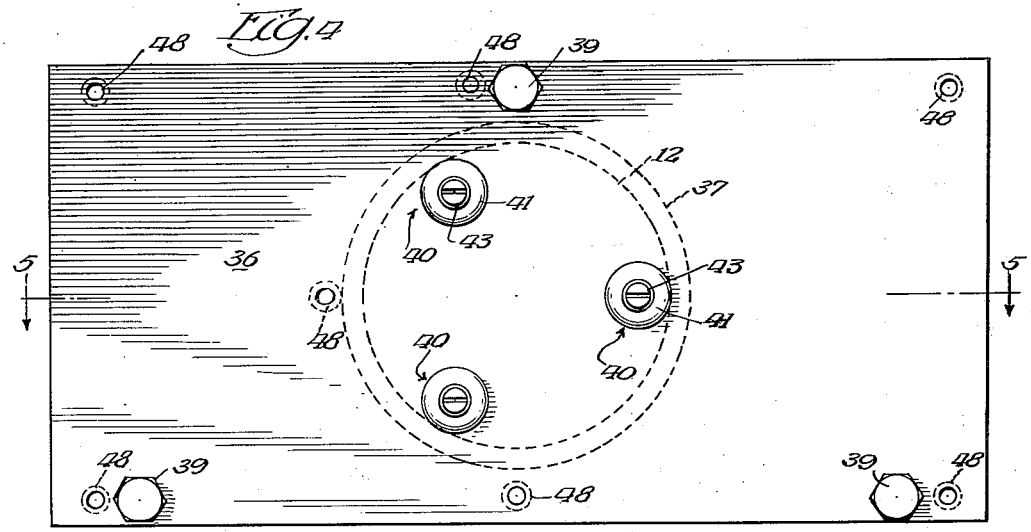
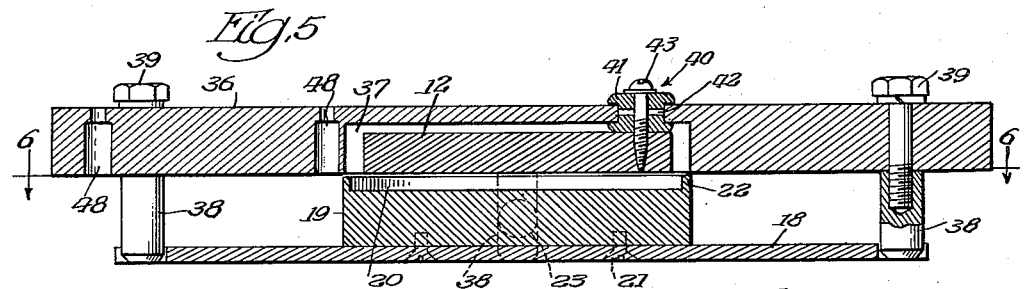
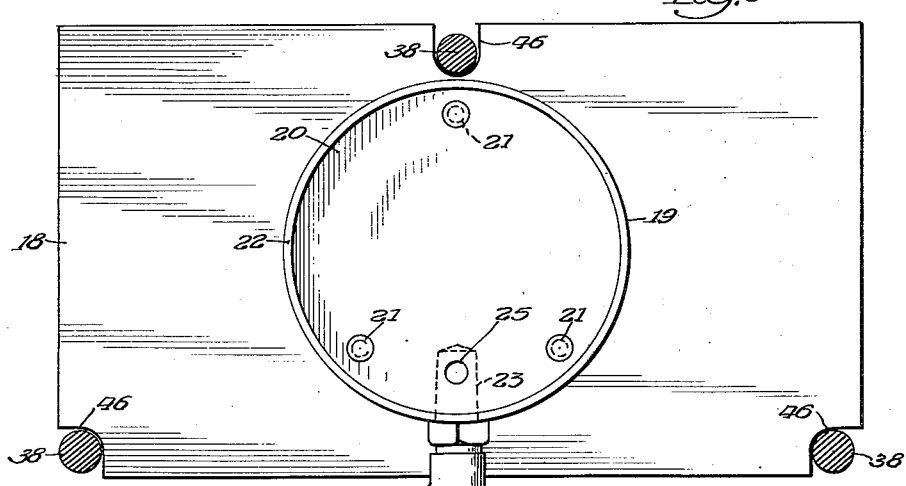
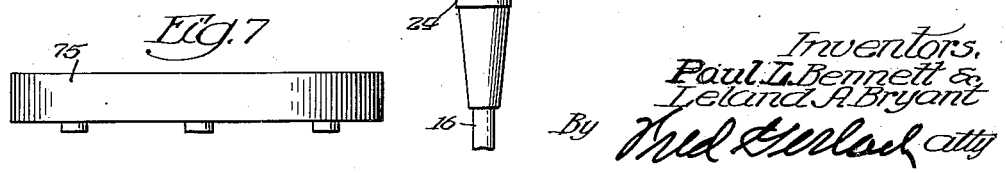
Inventors,
Paul L. Bennett &
Leland A. Bryant
By Fred Gerlach Atty Dec. 5, 1950  P. L. BENNETT ET AL  2,532,883
CONDENSER MEANS FOR MEASURING LEVEL CONDITIONS
Filed April 30, 1945  3 Sheets-Sheet 3
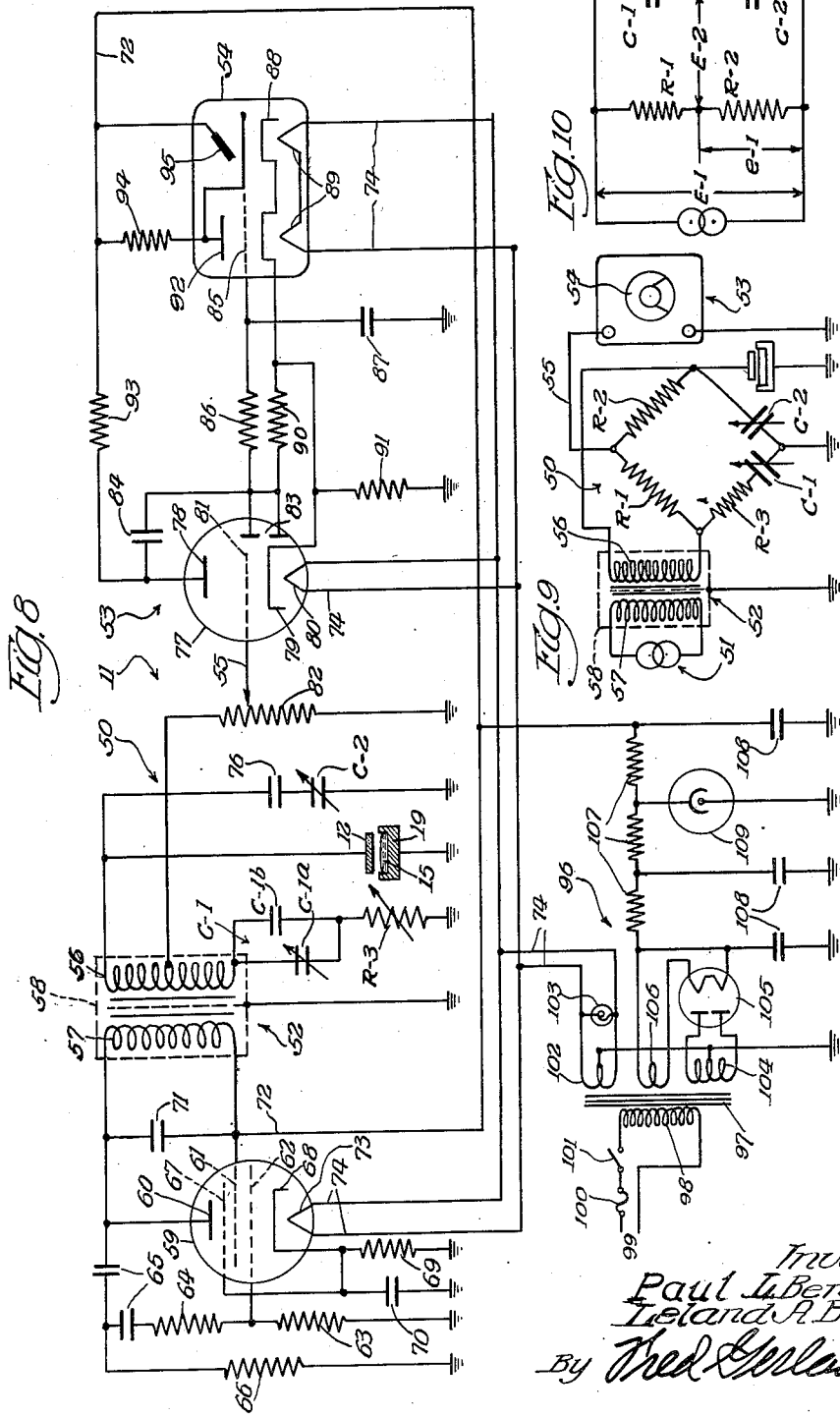
Inventors.
Paul L. Bennett &
Leland A. Bryant
By Fred Gerlach atty Patented Dec. 5, 1950

2,532,883

UNITED STATES PATENT OFFICE 2,532,883

CONDENSER MEANS FOR MEASURING LEVEL CONDITIONS

Paul L. Bennett, Burbank, and Leland A. Bryant, Los Angeles, Calif.; said Bennett assignor to said Bryant Application April 30, 1945, Serial No. 591,176

17 Claims. (Cl. 33—209)

The present invention relates in general to electronics and has more particular reference to electronic equipment for precision leveling, and the herein disclosed methods of leveling.

The degree of accuracy with which assembly tools, jigs and fixtures may be set up in a tooling dock depends upon the precision with which the dock, support base or other base structure has been leveled. Leveling equipment and methods heretofore available permit leveling within limits of error of about one thousandth of an inch in twenty-four inches of length. Optical methods also may be used with comparable accuracy within lengths up to a few feet. Available methods, however, do not afford desirable accuracy in leveling support members or surfaces in excess of ten feet of length. Recent developments, particularly in aircraft industry, requiring the setting up of tooling docks of the order of twenty-five feet in length, present leveling problems that may be met only with considerable difficulty with available leveling equipment.

An important object of the present invention is to provide novel leveling equipment and methods capable of rapid and precise leveling measurements within limits of error of the order of one-half thousandth of an inch over distances in excess of twenty-five feet.

Another important object of the invention is to utilize electronic means for indicating minute variation in level.

Another important object is to provide means for measuring altitude or level within minute limits of error at remotely located measuring stations spaced apart distances of the order of twenty-five feet, and up, by measuring electrical capacity between a member or surface being leveled and leveling means comprising a part of the leveling apparatus; a further object being to accomplish the measurement by an electronic circuit embodying a normally balanced bridge, divergence in capacity and consequently of level being measured by the degree of unbalance in the bridge circuit.

Another important object is to employ electronic means, particularly a Magic Eye tube to afford an accurate visual indication of unbalanced bridge conditions and thereby furnish extremely rapid and accurate visual indication of level.

Another important object resides in providing uniform pools of conducting liquid, such as mercury, at leveling stations in the surface to be measured and obtaining leveling measurements as determinations of capacity between such pools and measuring plates forming a part of the measuring apparatus.

A further object is to provide means for establishing a level reference or datum plane, for leveling purposes, comprising a plurality of interconnected pools of mercury or other suitable conducting liquid; a further object being to utilize a common reservoir to regulate the height of the mercury in the several pools, leveling being accomplished by adjusting the member being leveled until electronic measuring means, associated with each pool, indicates a leveled condition.

The foregoing and other important obbjects, advantages and inherent functions of the invention will become apparent as the same is more fully understood from the following description, which, taken with the accompanying drawings, discloses a preferred embodiment of the invention.

Referring to the drawings:

Fig. 4 is a sectional view taken substantially along the line 4—4 in Fig. 1;

Fig. 5 is a sectional view taken substantially along the line 5—5 in Fig. 4;

Fig. 6 is a sectional view taken substantially along the line 6—6 in Fig. 5;

Fig. 7 is an elevation view of a gauge block used in calibrating the apparatus;

Fig. 8 is a wiring diagram of electronic equipment and conductors embodied in the device shown in Fig. 1;

Fig. 9 is an alternate circuit diagram; and

Fig. 10 is an equivalent diagram of a bridge circuit forming a part of the electronic system.

To illustrate the invention, the drawings show leveling equipment comprising electronic means 11 for measuring the electrical capacity between capacity means forming a reference plane and capacity plates 12 forming a part of the electronic equipment and having a predetermined relationship with respect to the member 13 being leveled, leveling being accomplished by establishing a level reference plane 14 in position operatively associated with the capacity plates 12, which lie in a common plane parallel with the surface of the member 13 to be leveled, and then adjusting the member 13 until the capacity is equal between the several plates 12 and suitable capacity means lying in the reference plane 14.

Figure 2:
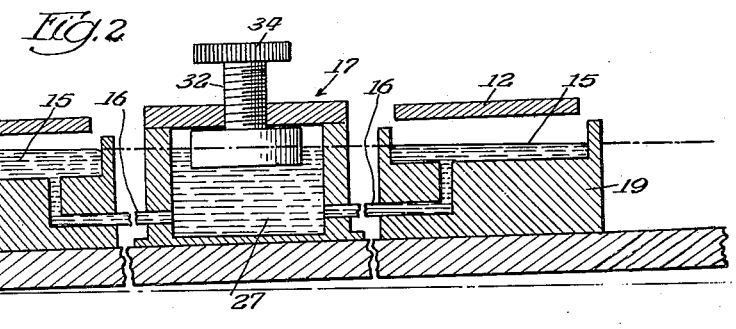
Fig. 2 is an exaggerated, schematic view of a portion of the apparatus.

In order to facilitate the establishment of the reference plane and to provide capacity means extending in said plane, at remote measuring stations, in position to cooperate with the several remotely positioned plates 12, pools 15 of conducting fluid, such as mercury, having identical area, may be employed, as shown diagrammatically in Fig. 2. One of the pools 15 may be located at a datum station which may be on the surface of the member 13, while another, or others, may be positioned at various remote stations on the member. The pools are connected, by flexible, preferably transparent plastic tubes or pipes 16, with a central or common reservoir 17 provided with an adjusting plunger to regulate the altitude of the liquid level in the pools 15, which level forms the reference plane 14. The plates 12 are supported each above its corresponding pool, each plate being accurately adjusted so that the distance between all plates and the surface of the member 13 is identical. By measuring the capacity between each plate and its cooperating mercury pool, and by adjusting the member 13 until the measured capacities are identical, the member 13 may be leveled within limits of error of one thousandth of an inch over distances in excess of twenty-five feet.

As shown more particularly in Figs. 5 and 6, the mercury pools 15 may comprise each a preferably rectangular metallic mounting plate 18 having accurately ground parallel upper and lower surfaces, said plate being adapted to rest flat upon the upper surface of the member 13. The plate 18 carries a preferably metal block 19 secured to and projecting upwardly from the plate 18, in position preferably centered on the plate. The block 19 is preferably cylindrical and has an upwardly facing cavity 20 in its upper end, the lower end of the cylindrical block 19 being secured to the plate in any suitable or convenient fashion, as by means of countersunk screws 21 passing through the plate and taking into the lower end of the block to anchor it in place on the plate 18.

The cavity 20 preferably has a flat bottom and circular edges defined by an upstanding marginal rib or flange 22 comprising an integral portion of the block 19. The block 19 is also provided with a preferably radial socket 23 disposed in the block beneath the bottom of the upwardly facing cavity 20. The channel 23 opens at the side of the block and is drilled and tapped for the reception of a fitting 24 preferably formed of plastic material for connection with the connecting tube 16. The socket 23, inwardly of the fitting 24, communicates with the cavity 20 through a duct 25.

Figure 3:
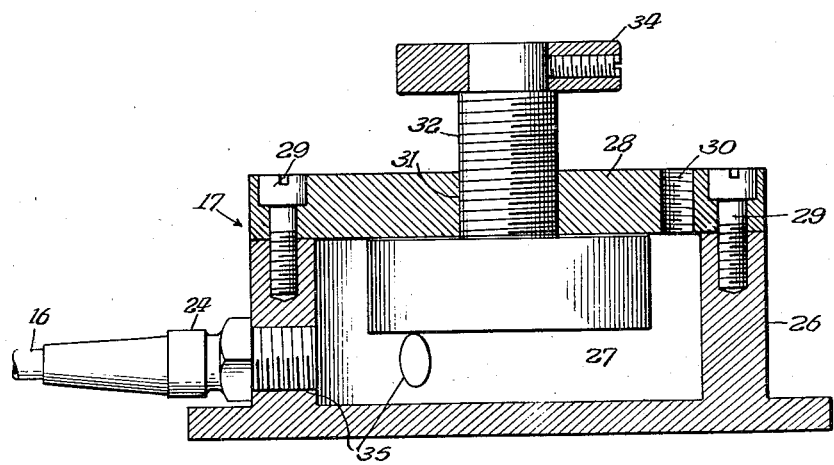
Fig. 3 is a sectional view taken substantially along the line 3—3 in Fig. 1.

The reservoir 17 is shown more particularly in Fig. 3 of the drawings and may comprise a cup-shaped base member 26 preferably of metal and having cylindrical walls forming a reservoir cavity 27 for containing mercury or other electrically conducting and level seeking liquid. The upper end of the cavity 27 is closed by a cover plate 28, secured in place in any suitable fashion, as by means of fastening screws 29 extending through the marginal edges of the cover and taking into the walls of the base. The cover plate 28 may be provided with a charging opening 30 normally closed by a threaded screw having a drilled vent opening therein. The cover plate 28 also has a central opening 31 through which extends a threaded stem 32 carrying a displacement block 33 on its inner end within the chamber 27. The outer end of the stem is provided with a handle 34 for turning the same in the cover to move the displacement block in the chamber 27.

The cylindrical walls of the base are provided with radially extending openings 35 drilled and tapped for the attachment of preferably plastic fittings 24 for connection with the tubes 16. The cavity 27 is normally partially filled with mercury, or other suitable electrically conductive fluid. Since the chamber 27 is connected with the pool cavities 20 by means of the tubes 16 and fittings 24, the conductive fluid will seek a horizontal level in a common plane comprising the reference plane 14, the altitude or elevation of which common plane may be regulated by adjusting the handle 34.

The diagrammatic showing in Fig. 2 illustrates an exaggerated tilt of the member 13 to be leveled, for illustrative purposes only. It will be understood that the member 13 to be precisely leveled will ordinarily be approximately level so that the angle made between the reference plane 14 will rarely, if ever, be in excess of a small fraction of a degree. The pools 15, when the device is in use for leveling purposes, will consequently be substantially identical in size, depth and electrostatic character. To this end, the blocks 19, including the cavity 20, the channel 23, and the duct 25, are made as closely as possible to common dimensions so that the several pools 15, for all practical purposes, will be of identical size.

The capacity plates 12, as shown more particularly in Figs. 4 and 5 of the drawings, also comprise accurately sized metal plates of identical size only very slightly smaller in diameter than the cooperating pools 15, as defined by the pool retaining flanges 22. The plates 12 are each supported in position on a support table 36 comprising a preferably rectangular plate 36 having a central cavity 37 in its underside for the reception of the plate 12, said cavity being substantially larger than the plate 12. The plate 36 is provided with a plurality of support legs 38, three support legs being shown in the illustrated embodiment. These legs preferably comprise cylindrical members which are rigidly fastened to the plate 36 in any suitable fashion, as by means of the bolts 39. The legs are accurately finished and attached in accurately located positions on the plate, the same being preferably ground to exact length after attachment on the plate so that the lower ends of the legs lie in a common plane, which is exactly parallel to the lower face of the plate.

The plate 12 is supported in the cavity 37 on insulated supports 40, each of which comprises a pair of collars 41 having cylindrical portions fitting into the opposite ends of opening 42 formed in the plate 36 between the upper surface of the plate and the bottom of the cavity 37. The insulating collars 41 are thus secured in the openings 42 and to the plate 36 and are secured to the capacity plate 12, as by means of threaded screws 43 extending through the collars 41 and taking into the plate 12, which is thus suspended in the cavity 37 in position insulated from the plate 36. After the plate 12 has been thus mounted, its lower surface is preferably ground flush with the lower surface of the plate 36.

The plate 18 carrying the pool 15 is formed with accurately positioned notches 46 in position to snugly receive the legs 38 so that when positioned on a surface being leveled, with the plate 18 resting on said surface and the legs 38 also supported on said surface in the openings 45 of the plate 18, the capacity plate 12 will be accurately centered and positioned above the pool cavity 20, with the surface of the plate 12 in accurate parallelism with respect to and accurately spaced from the surface being leveled, thus affording a means to measure, by a capacity determination, the distance between the surface of the pool 15, representing a true horizontal reference plane, and the facing surface of the cooperating capacity plate, representing the surface being leveled.

It is, of course, possible to effect the leveling measurement by electrical contact between the plate 12 and the fluid medium forming the pool, as by providing for lowering the plates 12 until contact is made, and thus determining level by comparison of the distance through which the plates have been lowered. Maximum accuracy cannot, however, be realized in such fashion, since it is difficult to measure, by electrical contact, within limits of error of about one thousandth of an inch, due to the physical pressure required for making electrical contact with the pool liquid, especially when mercury is used. It is also desirable to have a readily obtained indication of the actual distance of the plate above the reference plane in order to facilitate adjustment of the surfaces, and consequently it is desirable that the plates 12 be fixed plates. Leveling measurements, therefore, are preferably accomplished by determining capacity between the plate 12 and the surface of the pool 15.

Figure 1:
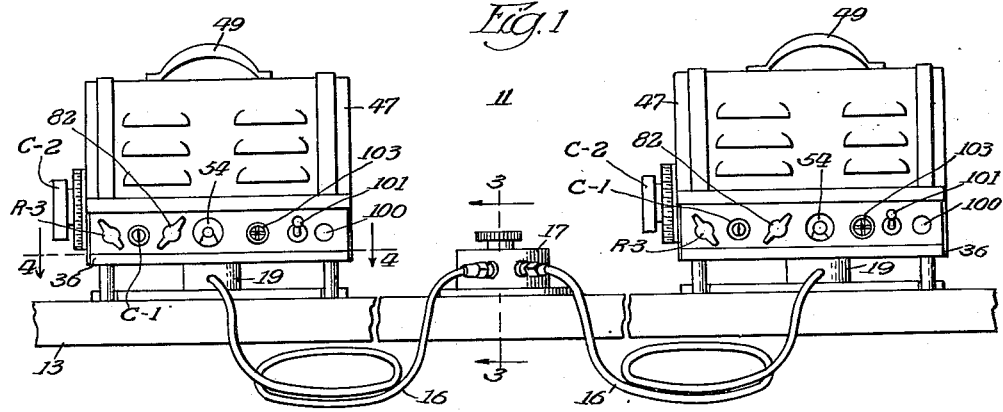
Fig. 1 is an elevation view of leveling apparatus embodying the present invention.

In order to determine capacity between the plate 12 and the mercury pool 15, electronic apparatus, as shown more particularly in Figs. 8, 9 and 10, may be employed, the several elements of the apparatus being preferably enclosed in a handy casing 47 erected upon the support plate 36, as shown more particularly in Fig. 1 of the drawings. To this end, the support plate 36 may be provided with drilled openings 48. For convenience in transportation, the case may be provided with a carrying handle 49.

It will be seen that the electronic measuring apparatus comprises a simple resistance-capacitance bridge 50 powered from an oscillator 51 through shielded transformer means 52. The bridge is normally balanced and is used to control indicating means preferably comprising an indicator circuit 53 incorporating a Magic Eye tube 54. When the bridge is in balance, the shadow angle of the Magic Eye tube is at a maximum, said angle decreasing as the bridge becomes unbalanced, for example, as a result of divergence in the capacity at the mercury pool from a preselected value.

As shown more particularly in Fig. 9 of the drawings, the bridge 50 may comprise a pair of resistance elements R—1 and R—2 which are interconnected with a conductor 55 leading to the indicator circuit 53, said resistance units forming two identical legs of the bridge, the third leg of which comprises an adjustable resistance element R—3 of the order of ten thousand ohms in series with adjustable balancing condenser means C—1, which may comprise a fixed condenser C—1a, having capacity of the order of 120 mmfd., in parallel with an adjustable balancing condenser C—1b having capacity of the order of 10 mmfd. The remaining leg of the bridge comprises a calibrated variable condenser C—2. The third and fourth legs of the bridge are interconnected and connected to ground. The third and fourth legs are also connected respectively with the first and second legs and to the secondary winding 56 of the transformer 52. The condenser comprising the plate 12 and the mercury pool is interconnected in parallel relation with the calibrated condenser C—2, being connected between ground and the junction of the bridge legs comprising the resistance unit R—2 and the condenser C—2, the plate 12 being electrically connected to said junction, as through screw 43, and the mercury pool being grounded through the cavity block 19 and the mounting plate 18.

As shown in Fig. 8, the bridge circuit 50 may be simplified by eliminating the resistance units R—1 and R—2, as separate elements as by connecting the conductor 55 to a center tap on the secondary winding 56 of the transformer, whereby the transformer winding on the opposite sides of the center tap provides the equivalent of equalized resistance units R—1 and R—2.

The transformer 52 has its primary winding 57 connected to the oscillator 51, which is designed to supply high frequency electrical power, at a frequency of the order of ten kilocycles, to the bridge circuit through the transformer, which is preferably enclosed within a grounded shield 58. The shielded transformer serves a dual purpose in that it functions not only as an isolated source of power for the bridge circuit, but also operates as a tuned circuit determining the frequency of the oscillator, and for the suppression of harmonics. Suppression of harmonics is particularly desirable since the various legs of the bridge circuit contain inductance, which will disturb the balance in response to the application thereto of harmonics. The transformer consequently is electrostatically shielded to avoid capacity coupling between the oscillator and any part of the bridge. It is not, however, necessary to keep the capacity between the transformer secondary and ground particularly small, since each instrument is calibrated with its own transformer. It is essential, however, that existing characteristics do not change over a period of time, or within normal temperature range, since such variation would affect the calibration of the condenser C—2.

The capacity C—1 may be adjusted by means of a convenient set screw exposed outwardly of the housing 47, while the resistance R—3 may be manually operated by a convenient knob adjacent the set screw. The condenser C—2 may be provided with a large calibrated dial extending at an end of the housing 47 for convenient operation.

Any suitable or preferred oscillator may be employed. As shown, the oscillator 51 comprises a tube 59 having a plate 60 connected with one side of the transformer winding 57, a screen grid 61 connected with the other side of the transformer winding 57, a suppressor grid 67 connected to the cathode 68, a control grid 62 connected to ground through a resistor 63, of the order of 20,000 ohms, and connected to the plate 60 through a resistance unit 64 of the order of 100,000 ohms, and condensers 65, in series, the interconnected plates of the condensers 65 being grounded through a resistor 66 of the order of 100,000 ohms, the condensers 65 each having fixed capacity of the order of 45 mmfd. A condenser 71, having capacity of the order of 0.002 mmfd., also is connected between the opposite ends of the primary winding of the transformer, and operating potential is applied to the tube element 61, as by means of the conductor 72 as well as to the tube element 60, through the transformer winding 57. The cathode of the tube is excited as by means of a filament 73 supplied with energizing current through filament current conductors 74.

The output of the oscillator tube is thus applied to the parallel-tuned primary of the bridge transformer, the plate of the oscillator being coupled to the grid 62 through the phase-shifting network comprising the condensers 65 and the resistors 63, 64 and 66. The loss through this network is adjusted as by varying the resistors 63 and 64 to the point at which stable oscillation is maintained.

Except for the necessity of slight readjustment of the adjusting resistance R—3 for various mercury levels in the pool 15, the bridge is always balanced in the same proportions, since the decrease in capacity due to separation of the mercury pool and the capacity plate 12 is compensated for by adding an equal increment by adjustment of the calibrated condenser C—2.

Calibration of the instrument may be accomplished by substituting, for the mercury pool, a precision ground gauge block 75, shown in Fig. 7, of steel and of such dimensions that it forms a gap of predetermined width between itself and the capacity plate 12. The gauge block may be conveniently formed to provide a gap of say 0.020 of an inch with the capacity plate. With the dial of the condenser C—2 set at its 0.020 graduation, the bridge may be carefully balanced by varying the resistance R—3 and by adjusting the balancing condenser C—1 to obtain a precise balance. This procedure will result in adjusting the calibrated condenser C—2 to the condenser formed by the plate 12 and its cooperating mercury pool whereby, when the bridge circuit is in balance, the distance between the plate 12 and the mercury pool will be indicated on the graduated dial of the condenser C—2.

In order to facilitate the use of the instrument, the dial of the condenser C—2 is graduated and marked directly in thousandths of an inch. Since the capacity between the mercury pool and the capacity plate 12 varies inversely with the distance separating them, the increments of capacity obtained by adjusting the condenser C—2 become smaller as the distance increases, thus crowding the graduated divisions at one end of the dial, if the condenser C—2 has semi-circular plates. This effect is aggravated if the condenser C—2 comprises a conventional straight line frequency type of unit. By employing a condenser with semi-circular plates and having a capacity of about 350 mmfd., and by operating it in series with a fixed padding condenser 76 of say 150 mmfd., a substantially linear scale may be obtained having the one-thousandth inch divisions spaced apart by 0.2 of an inch around a 4.25 inch dial, covering a total distance range from 0.016 to 0.050 of an inch.

The indicating circuit 53 comprises an amplifier tube having an anode plate 78, a cathode 79 energized by a filament 80 supplied with current through the conductors 74. The output voltage from the bridge is fed to the grid 81 of the amplifier tube through the conductor 55 and an adjustable sensitivity control resistor 82. The output from the plate 78 is rectified by diode plate means 83 thus charging the condenser 84, which is connected between the anode 78 and the diode plate means, thereby applying a negative voltage upon the grid 85 of the Magic Eye tube 54, through the resistor 86, subject to the filtering action of a condenser 87. The Magic Eye tube also includes cathode means 88 energized by filaments 89, which are supplied by current through the lead conductors 74. The cathode means 88 is electrically interconnected with the cathode 79 of the amplifier tube, said cathodes being connected with the diode plate means 83 through a resistance unit 90, and being also connected to ground through a resistance unit 91. The anode of the amplifier tube is connected with the anode 92 of the tube 54 through resistance units 93 and 94, connected in series, and the shadow controlling element 95 is connected to the plate of the amplifier tube through the resistance unit 93, said element 95 being also connected with the conductor 72 supplying operating potential.

The equipment may also include a power pack 96 for supplying voltage on the conductor means 72 and to supply filament current for energizing the filaments of the tubes 54, 59 and 77 through the current conductors 74. To this end, the power pack 96 may comprise transformer means 97 having a primary winding 98 adapted to be energized from a suitable power source 99 through conductors including a fuse 100 and a control switch 101. The transformer may include secondary windings including a winding 102 having a preferably grounded center tap and connected with the filament current conductors 74. A pilot lamp 103 may be interconnected between the conductors 74 to indicate that the tube filaments are being energized. The transformer also includes a secondary winding 104 preferably having a grounded center tap and ends connected with the anodes of a rectifier tube 105, the cathodes of which are energized by a secondary winding 106 of the transformer 97. When the tube 105 is in operation, it will deliver rectified power between ground and the voltage conductor 72 for application to the Magic Eye tube and also in the oscillator circuit 51. The rectified voltage is delivered from the cathodes of rectifier 105 to the conductor 72 through a filtering and regulating network comprising the series resistors 107, condensers 108, and a tube unit 109, for voltage regulation.

The application of negative voltage to the grid 85 of the Magic Eye tube 54 causes the shadow angle to decrease indicating unbalanced bridge conditions. Bridge balance is indicated when the shadow angle is at a maximum. The sensitivity control 82 is provided because the voltage sensitivity of the detector should be high in order to facilitate precise adjustment, while low sensitivity is desirable when the bridge is considerably out of balance, sensitivity being increased by adjustment of the resistor 82, as balanced bridge condition is approached. A convenient manually operable knob may be provided for adjusting the resistor 82 outwardly of the casing 47. The voltage gain of the amplifier is preferably of the order of fifty, while the diode rectifier 83 responds to peak signal conditions. As a consequence, the bias applied to the grid of the Magic Eye tube will be approximately fifty times the peak voltage delivered from the bridge and applied on the grid of the amplifier tube.

In Fig. 10 of the drawings, the basic electrical features of the bridge circuit are indicated diagrammatically for the purpose of discussing the same. In Fig. 10, c—1 represents the capacitance of that leg of the circuit containing the adjustable balance condenser C—1, while c—2 represents that leg of the bridge containing the calibrated condenser C—2 and in parallel therewith, the condenser afforded by the plate 12 and mercury pool 15. The resistances R—1 and R—2, in Fig. 10, of course, represent the resistance legs of the bridge, or, alternately, the secondary windings of the bridge transformer 58.

It will be obvious that the output voltage of the bridge will be the difference between the voltages $e-1$ and $e-2$, across R—2 and c—2 respectively. Thus, if E1=the voltage delivered to the bridge, and
E2=the voltage delivered from the bridge, then $$E2 = E1\left(\frac{R2}{R1+R2}\right) - E1\left(\frac{c1}{c1+c2}\right) \quad (1)$$

Where $R1=R2$, by design, Equation 1, supra, becomes:

$$E2 = E1\left(\frac{1}{2} - \frac{c1}{c1+c2}\right) \quad (2)$$

When the bridge is balanced, $c1=c2$, and $$E2 = E1 \, (1/2-1/2) = 0$$

For the sake of simplicity and convenience, the size of the plate 12 may be, and preferably is, chosen such that the capacity between it and the mercury pool is 100 mmfd., when the distance therebetween is 0.020 of an inch; a decrease in the distance between the plate and mercury pool of 0.0002 of an inch will consequently increase the capacity by approximately 1 mmfd., since capacity is inversely proportional to the distance. The stray capacity encountered in the bridge transformer and the wiring is preferably held by design to about 100 mmfd., in parallel with the mercury pool capacity, giving a total capacity to ground of 200 mmfd. The stray capacity remains substantially constant so that for a change of distance between the plate 12 and pool 15 of approximately 0.0002 of an inch there will be a change in capacity of 1 mmfd. in the capacity c—2 in Fig. 10. By substitution in Equation 2, supra $$E2 = E1 \, (1/2 - 200/401) = 0.00125 \times E1 \quad (3)$$

Since the voltage E2 is applied to the grid of the amplifier tube 77, and said amplifier tube has a voltage gain factor of fifty, the bias applied to the grid of the Magic Eye tube will be:

$$50 \times E2 = 50 \, (0.00125 \times E1) = 0.0725 \times E1 \quad (4)$$

The characteristics of the Magic Eye tube are such that a change in negative bias of one volt will close the shadow angle by from ten to twenty degrees, an amount readily observable. In order to obtain such indication in response to change in spacement between the plate 12 and the mercury pool of 0.0002 of an inch, the value of E1 must be such that $$0.0725 \times E1 = 1, \text{ or } E1 = 13.8 \text{ volts, peak} \quad (5)$$

In actual practice it has been found quite easy to observe a five degree change in shadow angle, so that it is possible to detect a divergence of 0.0001 inch by eye. This is several times the sensitivity required in this particular instrument. Changes of 0.5 percent in any arm of the bridge will cause an error of about 0.0002 inch in reading, but this is easily corrected, due to the method of calibrating. It has been found that the bridge circuit components do not change by as much as this, so that recalibration is seldom necessary.

It is important to avoid any direct coupling between the detector circuit 53 and any part of the oscillator or bridge circuit except through the sensitivity control, as any voltage so encountered would have to be counteracted by a phase-opposing voltage obtained by unbalancing the bridge, the amount of unbalance depending on the sensitivity setting. Since the detector must respond accurately to a voltage roughly one-thousandth that of the oscillator, it will be seen that very good isolation is needed, considering that all circuits are contained in a small box of the order of five by six by ten inches in size.

One difficulty encountered in operating the level is that of the mercury splashing up and sticking to the capacity plate, and of oxidizing on the surface thereof, thus changing or destroying the calibration. This may be overcome by adding a very thin film of oil to the surface of the mercury. It is essential to keep the thickness of this film exactly the same for both pools when adjusting two surfaces to the same plane, not because the weight of the oil changes the level of the mercury, but because the dielectric constant of the oil is more than twice that of air, and the capacity increases faster due to this than it decreases due to the change in mercury level. If leveling is being done from a common arbitrary reference position other than one of the surfaces being leveled, then a difference in oil level is not serious, since all surface levels are being referred to a common level, through a common medium. This is probably the most accurate way of using the system. The oil films are made substantially the same by carefully measuring and applying identical quantities of oil to the pools. It is impractical to completely fill the gap with oil, since it would then be difficult to control the weight of the oil, thus disturbing the mercury level.

To obtain accuracy over distances greater than about twenty-five feet, it is necessary to correct for the effect of curvature of the earth's surface. At a distance of about forty feet, the distance as is encountered between the center of an eighty foot tool dock and each end, the error, due to earth curvature, becomes approximately 0.001 inch. This error varies as the square of the distance, being only about 0.0001 inch at fourteen feet, and therefore, is negligible in a twenty-five foot dock.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. Measuring apparatus comprising means forming a pool of liquid having remote surface portions extending at spaced measuring stations, a cooperating measuring member at each station, support means to support the members above the surface portions of the pool and in known relation with respect to an object to be leveled, and means to measure the capacity, between each of said members and the cooperating surface portions of said pool.

2. Measuring apparatus comprising means forming a pool of liquid having remote surface portions extending at spaced measuring stations, a cooperating measuring member at each station, support means to support said members above the surface portion of the pool and in known relation with respect to an object to be leveled, and electronic means for measuring the electrical capacity between each of said members and the cooperating surface portions of said pool, in terms of the distance therebetween.

3. Measuring apparatus comprising means forming a pool of electrical conducting fluid providing a self-leveling surface having remote surface portions extending at spaced measuring stations, a condenser plate at each station and a frame to support each plate above the surface of said pool at its corresponding station and in known relation with respect to an object to be leveled, and means to measure the capacity reactance between the plates and the surface of said pool at said measuring stations whereby to determine the inclination of the surface to be leveled.

4. Measuring apparatus comprising means forming a pool of liquid having remote surface portions extending at spaced measuring stations, said means comprising a member at each of said stations and formed with an upwardly facing cavity adapted to contain the liquid as a pool of predetermined area, each of said members being adapted for support on an object to be leveled, a cooperating support frame for each member, means forming a condenser plate on each frame, and means to support each of said frames on said object to be leveled in position presenting its condenser plate above and in facing relationship with respect to the upwardly facing surface of a said pool, each of said frames and its cooperating member having interengaging means determining the mounted position of the frame with respect to the member to aline said condenser plate with said pool, and means to measure the capacity between each of said condenser plates and the surface portions of its associated pool.

5. Measuring apparatus comprising means forming a pool of liquid, a cooperating electrostatic measuring member, support means to support the member above the surface of the pool and in known spaced relation with respect to a surface to be leveled, whereby said member and the facing surface portion of the pool form an electrostatic condenser, said pool forming means comprising a block formed with an upwardly opening, accurately sized cavity, means forming a fluid reservoir and means including tubes of flexible material interconnecting said reservoir and said cavity whereby to maintain fluid at a predetermined level in said cavity.

6. Measuring apparatus comprising means forming a pool of liquid, a cooperating electrostatic measuring member, support means to support the member above the surface of the pool and in known spaced relation with respect to a surface to be leveled, said member comprising an accurately sized condenser plate, insulating supports mounting the plate on said support means, said support means being adapted to rest on the surface to be leveled and being accurately formed to carry said plate in exactly spaced parallel relation with respect to said surface.

7. Measuring apparatus comprising a member formed with an upwardly facing cavity adapted to contain a self-leveling liquid medium as a pool of predetermined area, said member being adapted to be supported on an object to be leveled, a cooperating support frame, means forming a condenser plate on said frame, and means to support said frame on said object in position presenting said condenser plate above and in facing relationship with respect to the upwardly facing surface of said pool, said frame and member having cooperating interengaging means determining the mounted position of the frame with respect to said member to aline said condenser plate with said pool, when said member and frame are in mounted position on said object, whereby the inclination of the object with respect to horizontal may be determined by measuring the capacity reactance between said plate and said pool.

8. Measuring apparatus comprising means forming a pool of liquid, having remote surface portions extending at spaced measuring stations, a cooperating measuring member comprising a condenser plate at each station, support means to support the plates above the surface portions of said pool and in known relation with respect to an object to be leveled, and means to measure the capacity between each of said plates and the facing surface portions of said pool.

9. Measuring apparatus comprising means forming a pool of liquid, having remote surface portions extending at spaced measuring stations, a cooperating measuring member comprising a condenser plate at each station, said condenser plates being of identical size and configuration, support means to support the plates above the surface portions of said pool and in known relation with respect to an object to be leveled, and means to measure the capacity between each of said plates and the facing surface portions of said pool.

10. Measuring apparatus comprising means forming interconnected pools of liquid of like surface area at spaced measuring stations and having the surfaces thereof extending in a common horizontal plane, a cooperating measuring member at each of said stations, support means to support the members above the surface portions of said pools and in known relation with respect to an object to be leveled, and means to measure the capacity between each of said members and the cooperating surface portions of said pools.

11. Measuring apparatus comprising a pair of pool members defining upwardly opening cavities adapted to form interconnected pools of liquid at spaced measuring stations and having the surfaces of said pools extending in a common horizontal plane, and a cooperating measuring member at each station, support means to support the members above the surface portions of said pools and in known relation with respect to an object to be leveled, and means to measure the capacity between each of said members and the cooperating surface portions of said pools.

12. Measuring apparatus, comprising a pair of pool members defining upwardly opening cavities adapted to form interconnected pools of liquid of identical surface area at spaced measuring stations, and having the surfaces of said pools extending in a common horizontal plane, and a cooperating measuring member at each station, support means to support the members above the surface portions of said pools, and in known relation with respect to an object to be leveled, and means to measure the capacity between each of said members and the cooperating surface portions of said pools.

13. Measuring apparatus, comprising a pair of pool members defining upwardly opening cavities adapted to form interconnected pools of liquid of identical surface area and circular shape at spaced measuring stations, and having the surfaces of said pools extending in a common horizontal plane, and a cooperating measuring member at each station, said members comprising condenser plates of identical area and circular configuration, support means to support the members in centered relation above the surface portions of said pools and in known relation with respect to an object to be leveled, and means to measure the capacity between each of said members and the cooperating surface portions of said pools.

14. Measuring apparatus, comprising means forming a pool of liquid, having remote surface portions extending at spaced measuring stations, a cooperating measuring member, comprising a condenser plate at each station, support means to support the plates above the surface portions of said pool and in known relation with respect to an object to be leveled, said support means comprising a frame member adapted to be mounted at each station and formed with supports adapted to rest upon the object to be leveled and to support said frame above the pool at a predetermined elevation with respect to the object, insulating means to mount a said condenser plate on its corresponding frame member, and means to measure the capacity between each of said condenser plates and the underlying surface portions of said pool.

15. Measuring apparatus, comprising means forming a pool of liquid, having remote surface portions extending at spaced measuring stations, a cooperating measuring member comprising a condenser plate at each station, such condenser plates being of identical size and configuration, support means to support the plates above the surface portions of said pool and in known relation with respect to an object to be leveled, said support means comprising a frame member adapted to be mounted at each station and formed with supports adapted to rest upon the object to be leveled and to support said frame member above the pool at a predetermined elevation with respect to the object, insulating means to mount a said condenser plate on its coresponding frame member, and means to measure the capacity between each of said plates and the underlying surface portions of said pool.

16. Measuring apparatus, comprising means forming a pool of liquid, having remote surface portions extending at spaced measuring stations, a cooperating measuring member comprising a condenser plate at each station, such condenser plates being of identical size and configuration, support means to support the plates above the surface portions of said pool and in known relation with respect to an object to be leveled, said support means comprising a frame member adapted to be mounted at each station and formed with supports adapted to rest upon the object to be leveled and to support said frame member above the pool at a predetermined elevation with respect to the object, each frame having a downwardly opening cavity for receiving its corresponding condenser plate therein, insulating means to mount a said condenser plate in a said cavity, on its corresponding frame member, and means to measure the capacity between each of said plates and the underlying surface portions of said pool.

17. Measuring apparatus, comprising means forming a pool of liquid, having remote surface portions extending at spaced measuring stations, a cooperating measuring member, comprising a condenser plate at each station, said condenser plates being of identical size and configuration, support means to support the plates above the surface portions of said pool, and in known relation with respect to an object to be leveled, said support means comprising a pair of identical frame members adapted to be mounted, one at each of said stations, and each frame member being formed with supports adapted to rest upon the object to be leveled and to support said frame member above the pool at a predetermined elevation with respect to the object, said frames having downwardly opening cavities of identical size and configuration for receiving, each, its corresponding condenser plate therein, insulating means to mount a said condenser plate in said cavity on its corresponding frame member, and means to measure the capacity between each of said plates and the underlying surface portions of said pool.

PAUL L. BENNETT.
LELAND A. BRYANT.

REFERENCES CITED

The following references are of record in the file of this patent:

UNITED STATES PATENTS

| Number | Name | Date |
| --- | --- | --- |
| 601,629 | Castor | Apr. 5, 1898 |
| 825,760 | Russell | July 10, 1906 |
| 1,566,174 | Tyler | Dec. 15, 1925 |
| 1,928,971 | Dillon | Oct. 3, 1933 |
| 2,032,016 | Hitner | Feb. 25, 1936 |
| 2,083,759 | Temple | June 15, 1937 |
| 2,200,863 | Schuck | May 14, 1940 |
| 2,252,727 | Pepper | Aug. 19, 1941 |
| 2,291,648 | Rider et al. | Aug. 4, 1942 |
| 2,322,681 | Zenor | June 22, 1943 |
| 2,357,023 | Reid et al. | Aug. 29, 1944 |
| 2,438,758 | Leach | Mar. 30, 1948 |

FOREIGN PATENTS

| Number | Country | Date |
| --- | --- | --- |
| 441,576 | Great Britain | 1936 |

OTHER REFERENCES

Journal of Scientific Instruments, April 1938.
Radio News, Sept. 1944, pages 40–42, 87, 88 and 90.